(12) United States Patent
Miranda et al.

(10) Patent No.: US 12,014,400 B1
(45) Date of Patent: Jun. 18, 2024

(54) SYSTEM AND METHODS FOR A UNIVERSAL INTEGRATION FRAMEWORK FOR DATA ANALYTICS PIPELINES

(71) Applicant: Amplitude, Inc., San Francisco, CA (US)

(72) Inventors: Zachery Miranda, San Francisco, CA (US); Leo Zhang, San Francisco, CA (US)

(73) Assignee: AMPLITUDE, INC., San Francisco, CA (US)

(*) Notice: Subject to any disclaimer, the term of this patent is extended or adjusted under 35 U.S.C. 154(b) by 1 day.

(21) Appl. No.: 16/986,090

(22) Filed: Aug. 5, 2020

(51) Int. Cl.
*G06Q 30/00* (2023.01)
*G06F 3/04847* (2022.01)
*G06Q 30/0201* (2023.01)
*G06Q 30/0241* (2023.01)
*H04L 9/40* (2022.01)

(52) U.S. Cl.
CPC ..... *G06Q 30/0277* (2013.01); *G06F 3/04847* (2013.01); *G06Q 30/0201* (2013.01); *H04L 63/0428* (2013.01)

(58) Field of Classification Search
CPC ............ G06Q 30/0277; G06Q 30/0201; G06F 3/04847; H04L 63/0428
See application file for complete search history.

(56) References Cited

U.S. PATENT DOCUMENTS

| | | | |
|---|---|---|---|
| 2005/0216525 A1* | 9/2005 | Wachholz-Prill | G06Q 30/0251 |
| 2015/0066884 A1* | 3/2015 | Tomarkin | G06F 16/22 707/695 |
| 2016/0321703 A1* | 11/2016 | Huang | G06Q 30/0269 |
| 2017/0177695 A1* | 6/2017 | Ritter | G06F 16/2255 |

FOREIGN PATENT DOCUMENTS

WO   WO-2015171117 A1 * 11/2015 ............... G06F 8/61

OTHER PUBLICATIONS

IBM, "IBM Cloud Solution Brief"; Apr. 2017 (Year: 2017).*
An MDA approach for the development of data warehouses from Relational Databases Using ATL Transformation Language A. Srail, F. et al. International Journal of Applied Engineering Research; 2017. (Year: 2017).*
A Methodology of Real-Time Data Fusion for Localized Big Data Analytics; Sohail Jabbar; IEEE; Apr. 2, 2018. (Year: 2017).*

* cited by examiner

*Primary Examiner* — Meredith A Long
(74) *Attorney, Agent, or Firm* — Goodwin Procter LLP (57) ABSTRACT

A system and methods for a universal integration framework for data analytics pipelines are disclosed. According to one embodiment, a computer-implemented method maintains internal consumer data that has a consumer ID associated with a consumer based on events at a partner platform. The platform server determines target characteristics based on instructions provided by a client or the internal consumer data and generates a target consumer group associated with an internal project ID based on the target characteristics, wherein the target consumer group includes the consumer ID and internal consumer data associated with each consumer. The platform server transmits the target consumer group to the partner platform and receives partner event data indicative of updates to consumer data. The platform server generates an updated target consumer group based on the updated consumer data and transmits updates to the partner platform to improve consumer interest.

17 Claims, 5 Drawing Sheets

Error Handling Method 400

SYSTEM AND METHODS FOR A UNIVERSAL INTEGRATION FRAMEWORK FOR DATA ANALYTICS PIPELINES

FIELD

This disclosure generally relates to computing systems, and more specifically to a universal integration framework for data analytics pipelines.

BACKGROUND

Estimates suggest continued growth in Internet ad spending, as advertisers continue to shift to online media as a more effective way to reach consumers. Commonly, advertisers group advertisements ("ads") or targeted messaging into one or more campaigns that are used to push advertising or messaging online. To increase the likelihood that target users will be presented with ads or messages from the right campaign, advertisers/publishers often associate targeting criteria with the advertising campaign or with ads in the advertising campaign. The targeting criteria identify one or more characteristics of users the advertiser desires to view an ad or message. Examples of targeting criteria include gender, age, interest, or some other demographic.

Often, for a campaign to be effective, data about the campaign is provided from the publisher to an analytics platform. The problem, however, is that there may be multiple publishers that each have their own proprietary interfaces and targeting criteria. No solution exists to effectively generate analytics or other useful data in a unified manner.

SUMMARY

A system and methods for a universal integration framework for data analytics pipelines are disclosed. According to one embodiment, a computer-implemented method, comprises receiving, by a platform server, a first set of data having internal consumer data that has a consumer ID associated with a consumer. The platform server determines target characteristics based on the internal consumer data. The platform server generates a target consumer group associated with an internal project ID based on the target characteristics, wherein the target consumer group includes the consumer ID and internal consumer data associated with each consumer. The platform server transmits to a partner platform, authentication credentials associated with the partner platform. The platform server transmits to the partner platform, the target consumer group to the partner platform.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a marketing campaign to target consumers based on segmented user data. Specifically, the analytics tools described herein can be directly integrated into advertising partners and other online platforms in order to target consumers based on their habits and activity within the marketed product and partner platforms, according to some embodiments. The analytics tools, according to some embodiments, can map users between products and more precisely identify the target consumers in partner platforms. For example, the analytics tools can provide a uniform integration framework that identifies target consumers based on their activity across products and platforms and initiates target marketing campaigns oriented toward said target consumers through a specified platform, eliminating large amounts of consumers that could typically be included in standard advertising practices—all while providing enhanced consumer interaction and conversion analytics.

Specifically, the present technology permits a client to integrate an analytics service into a partner platform for transmitting target consumer definitions to said partner platform. According to some embodiments, the present system solves the technical problem and provides an improvement over prior systems in that with the present system the client may integrate an analytics service without writing, or otherwise understanding how to write, computer code. In doing so, access to the partner platform and its data may be provided to the analytics service. The present technology provides benefits that remove barriers associated with analyzing first-party data (e.g., data provided by the client) and third-party data (e.g., data provided by the partner platform) together and/or otherwise alongside one another. For example, a client may provide to the analytics service a data set containing first-party data, such as user data from the client's product and, in turn, may use the access to the partner platform and its data to perform deep data analytics not available to the client outside of the analytics service. This provides the client with a single platform containing a unique combination of data and powerful analytics that, without such integration into the partner platform, would not be accessible by the client.

Additionally, the present technology, through the use of an analytics service, can increase the reliability and usability of data provided by a partner platform. For example, when analyzing data provided by a partner platform, a client may not be able to identify the data most useful to the client and the data that may not be useful. This often leads to complexity issues while analyzing large swaths of data. Furthermore, the obscurity of such data sets may lead to poor or inaccurate results. The present technology provides a singular platform for intelligent data analytics to securely combine relevant data across one or more platforms. This provides not only a simplicity factor to complex analytical problems, facilitates a single point of data transfer, allowing for intelligent sharing between clients of the single platform.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present disclosure, and may be included in more than one example of the present disclosure. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

As used herein, a client may include any business, organization, or individual engaged in the marketing of goods and/or services to consumers or potential consumers. Actions attributed to a client may include actions performed by employees, third-party marketing agencies, or other agents of the client, and thus no distinction is made herein unless specifically discussed. In addition, as used herein, a partner may include any organization, entity, or platform that engages with consumers on behalf of a client, such as by providing advertisements or other advertisement-oriented communication to a consumer to encourage engagement with the client. A partner may further include an advertising agency, marketing software, customer-engagement services, or any other marketing platform, according to some embodiments. Some examples of partners may include, but are not limited to Facebook™, Braze, Intercom, Marketo™, Airship, Iterable, Leanplum, Segment, among others. Thus, a client and a partner may interact with each other outside of the integration and analytics framework as provided herein, and in turn, results of such interaction may be provided to the present framework for facilitating the most precise and efficient deep data analytics. Interactions facilitated outside of the present framework may include party-to-party contracts, agreements, marketing campaign data, or other communications between a client and a partner. Interactions may be facilitated by the present framework or otherwise provided by a client or partner after such interaction occurs, according to some embodiments.

Figure 1:
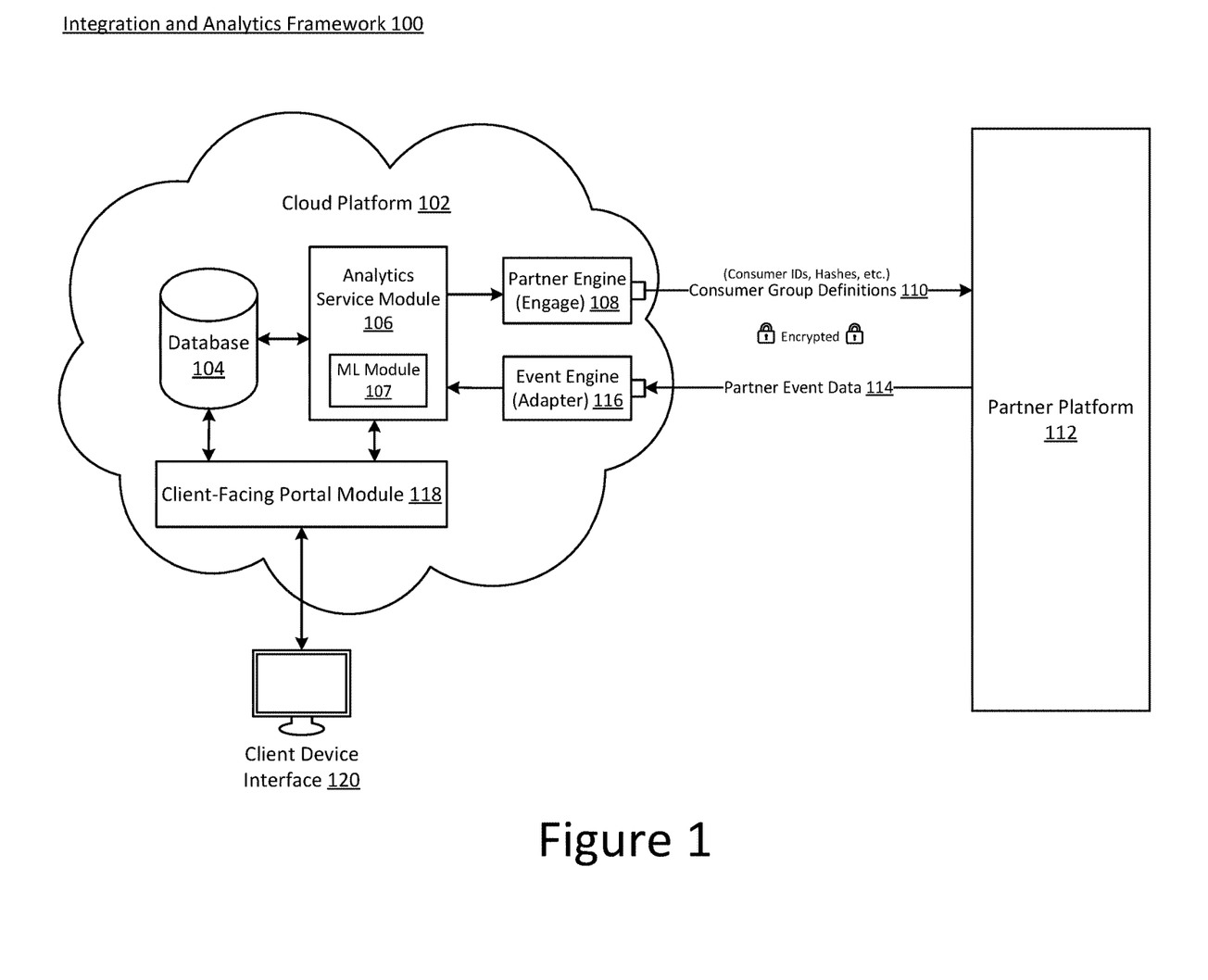
FIG. 1 illustrates an exemplary integration framework, according to some embodiments.

FIG. 1 illustrates an exemplary integration framework, according to some embodiments. The exemplary integration framework 100 includes cloud platform 102, which is communicatively coupled to partner platform 112 over a network. Cloud platform 102 is further communicatively coupled to client device interface 120 over a network. Cloud platform 102 includes a database 104. Database 104 may store first-party data, third-party data, data analysis inputs, data analytics results, among other data. Examples of data stored in database 104 may include user IDs, user data, marketing campaign data, among other data. Cloud platform 102 further includes data analytics service module 106, which is communicatively coupled to data base 104. Analytics service module 106 may be, among other apparatuses, a server, computer, or other processing device, that performs analytical procedures on data stored in database 104, as well as data received from partner platform 112. According to some embodiments, analytics service module 106 may include a machine learning module, such as ML module 107 as shown in FIG. 1.

Partner engine 108 may be utilized by analytics service module 106 in order to facilitate communication from analytics service module 106 to partner platform 112, according to some embodiments. Partner engine 108 may securely facilitate communication by applying encryption protocols to data before transmitting to partner platform 112. Encryption protocols may include a cryptographic or security algorithm that transforms data into randomized or otherwise secured data packets for secure transmission. These encryption protocols may include, but are not limited to, TLS/SSL, IPsec, SSH, PGP, among others, according to some embodiments. The encryption handled by partner engine 108 may further include cryptographic hashing protocols or other hash functions that, when executed, generate data hashes to be interpreted at the partner platform 112. The hashed data transmitted by partner engine 108 may include user IDs, user hashes, among other data, all of which are encrypted according to the particular encryption protocols as described above. The cryptographic hashing protocols may be a one-way operation, so if anyone intercepts the hashed data, they are not able to recover or otherwise interpret the data therefrom.

According to some embodiments, partner engine 108 may include an identification procedure and an authentication procedure in order to facilitate efficient communication from analytics service module 106 to partner platform 112. The output of such identification and authentication procedures may include consumer group definitions 110, according to some embodiments. Consumer group definitions 110 may include consumer IDs, consumer hashes, or other consumer-identifying indicators for use by partner platform 112. According to some embodiments, partner platform 112 may use consumer group definitions 110 to identify or otherwise describe particular users of its platform. Consumer group definitions 110 may be encrypted or otherwise securely transmitted to partner platform 112 as described above.

Partner platform 112 may transmit return data for interpretation by analytics service module 106 by way of event engine 116, according to some embodiments. The data received by event engine 116 may include partner event data 114, according to some embodiments. Event engine 116 may also receive data from webhooks or other sources configured to facilitate customizable web callbacks and is therefore capable of receiving various data from a wide variety of sources. For example, partner event data 114 may include partner project ID(s) associated with particular marketing campaigns, marketing analytics, data related to users of partner platform 112 (e.g., consumers, potential consumers), marketing conversion indicators, among others. According to some embodiments, event engine 116 provides for a transformation language for mapping the received data to data interpretable by analytics service module 106 and other components of cloud platform 102. The file and/or data structure of partner event data 114 may differ depending on partner platform 112 (e.g., API, webhooks). No matter the data structure of partner event data 114, event engine 116 may output a uniform representation of similarly structured data for interpretation by analytics service module 106.

Event engine 116 may be utilized by analytics service module 106 in order to facilitate communication from partner platform 112 to analytics service module 106, according to some embodiments. Event engine 116 may securely facilitate communication by decrypting encrypted data transmitted by partner platform 112 using decryption protocols. Decryption protocols used by event engine 116 may differ depending on the encryption used by partner platform 112. No matter the encryption protocols or partner event data file structure used by partner platform 112, event engine 116 may output a uniform representation of similarly structured data for interpretation by analytics service module 106.

According to some embodiments, event engine 116 may include an integration procedure and an identification procedure in order to facilitate efficient communication from partner platform 112 to analytics service module 106. The output of such identification and authentication procedures may include the uniform representation of similarly structured data as described above, which may be routed to a particular storage location in database 104, according to some embodiments. According to some embodiments, the output from event engine 116 may alternatively be routed to a particular location in memory associated with running procedures implemented by analytics service module 106.

Cloud platform 102 may further include client-facing portal module 118, according to some embodiments. Client-facing portal module 118 may facilitate communication between a client's device interface with cloud platform 102, according to some embodiments. Specifically, client-facing portal module 118 is communicatively coupled to database 104 and analytics service module 106 to provide a client access to the data associated with their account by way of client device interface 120. According to some embodiments, client-facing portal module 118 may generate or otherwise facilitate communication with a graphical user interface (GUI) for presenting on a client device interface 120. Client device interface 120 may include a web browser, application, or otherwise executable program running on or otherwise presented to the client by way of a personal computing device (e.g., mobile device, personal computer, etc.), according to some embodiments. According to some embodiments, the GUI as presented on client device interface 120 may provide the client with the ability to communicate with analytics service module 106 for the analytics services provided therein. According to some embodiments, the GUI as presented on client device interface 120 may further provide the client with the ability to request data associated with their respective account stored in database 104. Client device interface 120 may transmit to client facing portal module 118 instructions performable by analytics service module 106, according to some embodiments.

For example, a client may provide instructions using client device interface 120 by way of client-facing portal module 118 to analytics service module 106 to initiate a procedure performable by partner engine 108 (e.g., identification procedure, authentication procedure). The instructions provided by the client may include first-party data (e.g., consumer IDs and other internal client data) indicative of target consumers, or other characteristics that describe consumers targeted by a particular marketing campaign, according to some embodiments. The characteristics that describe target consumers, herein "target characteristics", may be used by analytics service module 106 with reference to first-party data to generate a consumer group, according to some embodiments. Consumer groups may include consumer IDs or other consumer-identifiable indicators, as well as target characteristics, among other data.

Figure 2:
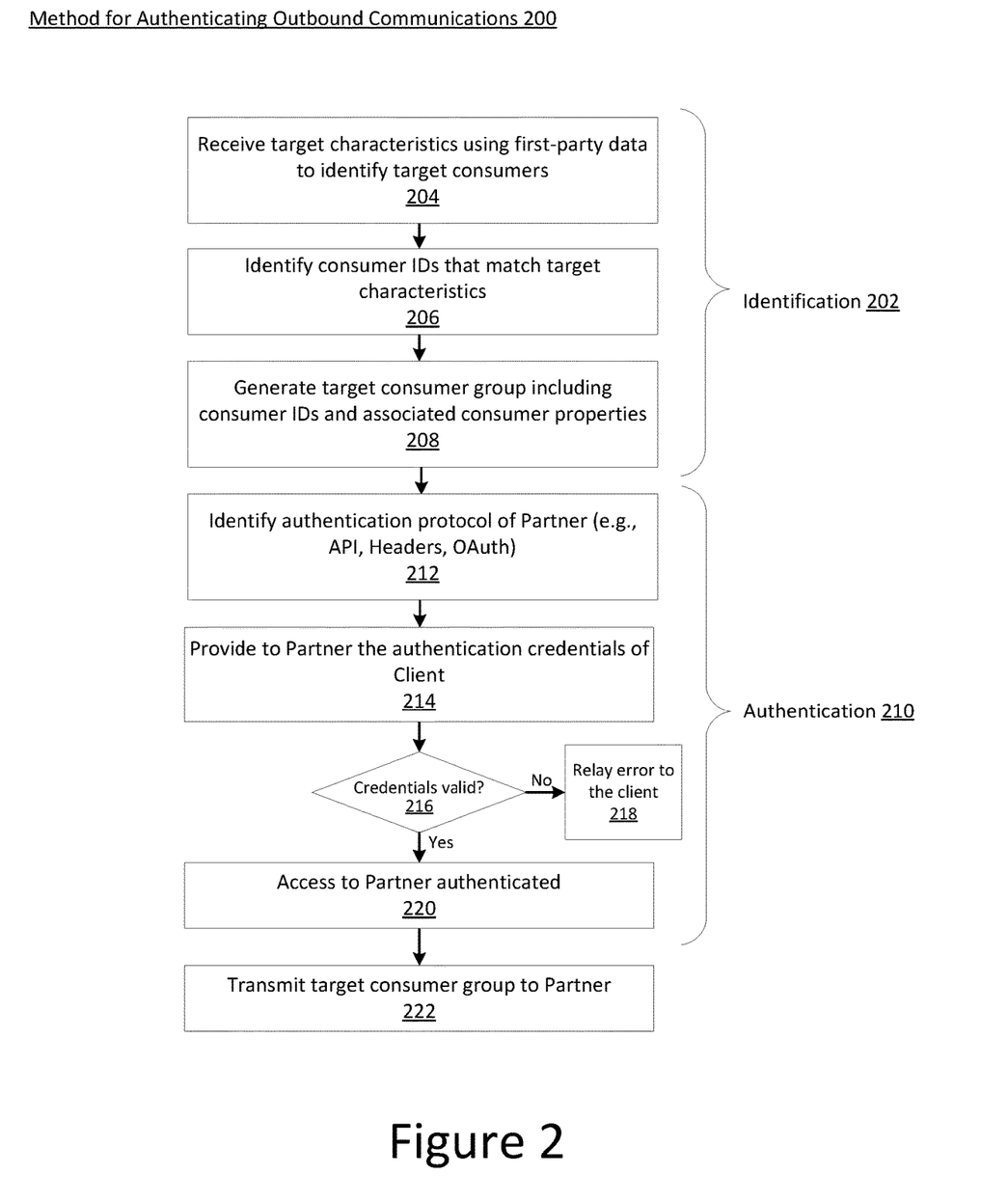
FIG. 2 illustrates an exemplary method for authenticating outbound communications, according to some embodiments.

FIG. 2 illustrates an exemplary method for authenticating outbound communications, according to some embodiments. Method 200 may include two procedures: identification procedure 202 and authentication procedure 210. According to some embodiments, identification procedure 202 and authentication procedure 210 may be executed by a cloud platform (e.g., cloud platform 102) or sub-elements thereof, including a partner engine (e.g., partner engine 108), an analytics service module (e.g., analytics service module 106), or a combination thereof.

According to some embodiments, identification procedure 202 includes receiving (204) target characteristics or other first-party data from a client to identify target consumers. According to some embodiments, target characteristics may be included in first-party data as provided by the client. According to some embodiments, target characteristics may alternatively be provided by the client separate from other first-party data. The analytics service module (e.g., analytics service module 106) may receive the target characteristics and/or first party data from a client by way of a client-facing portal module (e.g., client-facing portal module 118), according to some embodiments. The analytics service module may retrieve the target characteristics and/or first-party data from a database (e.g., database 104) of the cloud platform (e.g., cloud platform 102), according to some embodiments.

Identification procedure 202 further includes identifying (206) consumer IDs of target consumers that match the target characteristics as received at 204. According to some embodiments, consumer IDs may be included in first-party data as provided by the user or stored in the database of the cloud platform. According to some embodiments, consumer IDs may be internally generated by the analytics service module of the cloud platform to identify consumers independently from identification numbers provided by the client.

Identification procedure 202 further includes generating (208) a representation of a target consumer group. According to some embodiments, target consumer groups may include, but are not limited to, consumer IDs of target consumers, as well as associated consumer properties that describe each individual target consumer. Identification procedure 202 may further include storing the generated target consumer group in the cloud platform's database (e.g., database 104).

As described above, method 200 further includes authentication procedure 210. According to some embodiments, authentication procedure 210 includes identifying (212) an authentication protocol used by the intended partner platform (e.g., partner platform 112). Authentication protocols of partner platforms may include, but are not limited to API key authentication, header authentication using HTTP, or OAuth authentication, among others. No matter the authentication protocol used by the platform, credentials may be requested by the partner platform to initiate the authentication protocol of the partner platform. As such, authentication procedure 210 may further include providing (214) to the partner platform the client's authentication credentials necessary to login to the client's partner account, according to some embodiments. According to some embodiments, a client may have more than one partner account and, therefore, the cloud platform may provide multiple sets of authentication credentials. According to some embodiments, the authentication credentials of the client may be provided by the client and stored in the database of the cloud platform. Similarly, the client may customize authentication credentials at any time or otherwise provide authorization for accessing the partner platform.

Once the client's authentication credentials have been provided to the partner platform, the partner platform may confirm (216) that the credentials are either valid or invalid. If the credentials are not valid, an error indicating that the credentials are invalid may be relayed (218) to the client, according to some embodiments. According to some embodiments, the error may be relayed to the partner platform, engineers of the cloud platform, or any other entity involved with the authentication procedure 210. If the credentials provided to the partner platform are valid, access to the partner platform is authenticated (220) or otherwise granted. According to some embodiments, authenticating or granting access to the partner platform may include providing authentication keys or other security data to the cloud platform for re-establishing authentication for later access. According to some embodiments, a notice indicating that access to the partner has been authenticated may be provided to the client, the client's account of the partner platform, or the partner platform itself. Notice of authentication may be provided by way of a notification module of the partner platform, an email to the client, or another method of notification, according to some embodiments.

Once access to the partner platform has been authenticated, the partner engine may then be able to transmit (222) the target consumer group as generated by identification procedure 202 to the partner platform, according to some embodiments. Transmitting the target consumer group to the partner platform may further include transmitting other data associated with the target consumer group, including consumer IDs, associated consumer properties, among others. According to some embodiments, transmitting the target consumer group may further include encrypting the target consumer group and associated data using encryption protocols as described above.

Figure 3:
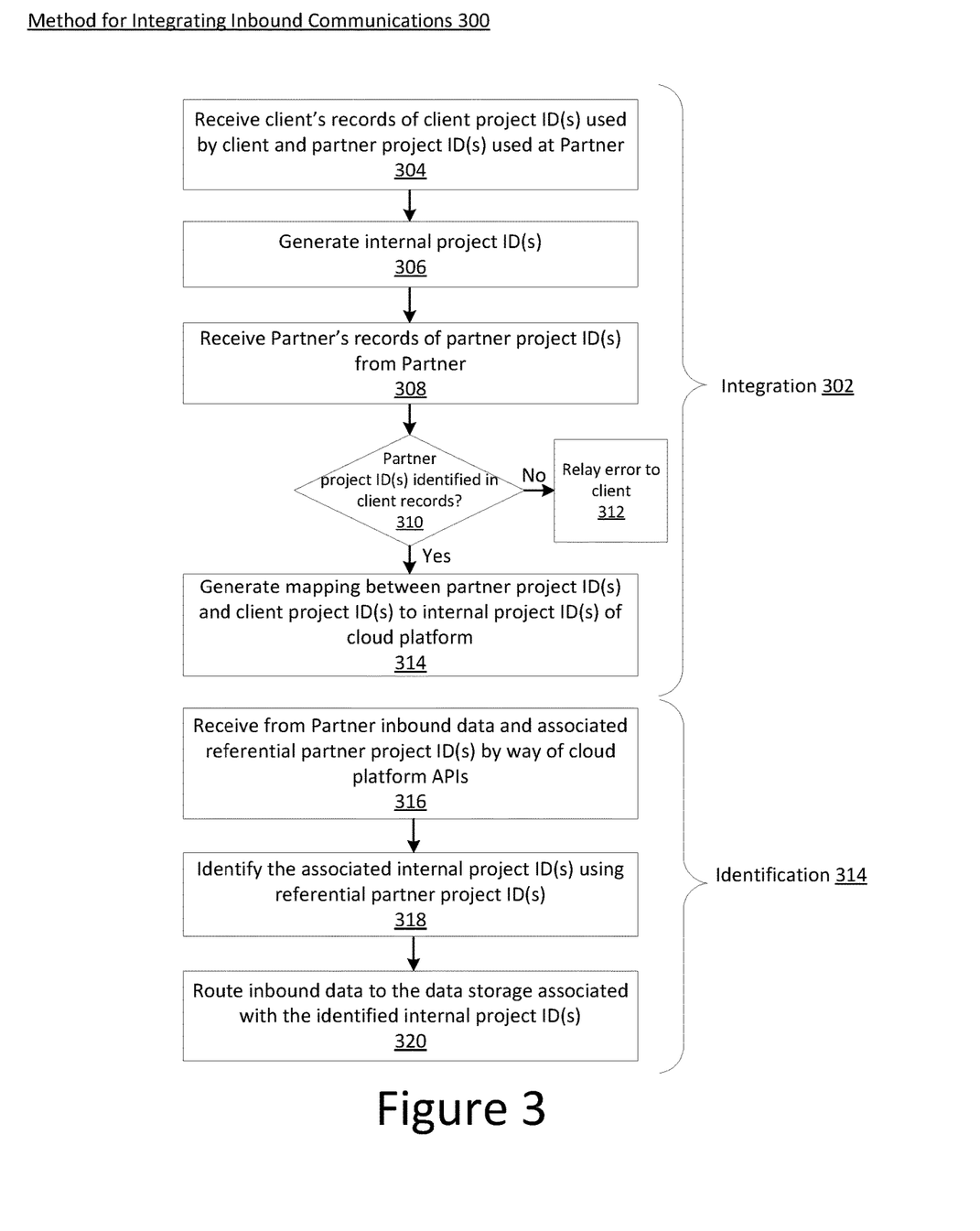
FIG. 3 illustrates an exemplary method for mapping inbound data, according to some embodiments.

FIG. 3 illustrates an exemplary method for integrating inbound communications, according to some embodiments. Method 300 may include two procedures: integration procedure 302 and identification procedure 314. According to some embodiments, integration procedure 302 and identification procedure 314 may be executed by a cloud platform (e.g., cloud platform 102) or sub-elements thereof, including an event engine (e.g., event engine 116), an analytics service module (e.g., analytics service module 106), or a combination thereof.

According to some embodiments, integration procedure 302 includes receiving (304) client's records of client project IDs and partner project ID(s) from the client. The client project IDs may be generated when a client forms or otherwise initiates a new marketing campaign, according to some embodiments. As such, client project IDs represent particular marketing campaigns or other projects initiated by the client.

The client may further initiate a marketing campaign associated with a client project ID through a partner platform (e.g., partner platform 112), according to some embodiments. In return, a client may receive from the partner platform, partner information related to the marketing campaign, including a partner project ID, according to some embodiments. Receiving a new partner project ID from a partner platform may influence the client to correlate the specified client project ID to the received partner project ID, creating a mapping between the two project IDs. As such, client project IDs may be indicative of or otherwise mapped to partner project IDs as provided to the client by the partner platform.

The partner project IDs may include some indication that the indicated projects are associated with the specified client, according to some embodiments. As described above, partner project IDs may represent particular marketing campaigns or other projects initiated by the client through the partner platform. When receiving a request to initiate a particular marketing campaign or other project by the client, the partner platform may generate, by way of its own internal processes, partner project IDs associated with the client's marketing campaign or otherwise requested project. According to some embodiments, the client may generate client project IDs associated with partner project IDs as provided by the partner platform. Client project IDs may be representative of or may otherwise contain reference to the associated partner project IDs as provided by the partner platform, according to some embodiments.

The client may provide to the cloud platform client project IDs and partner project IDs for later reference by the cloud platform. According to some embodiments, multiple client project IDs and/or partner project IDs may be provided at once by the client. Once client project IDs and partner project IDs have been received at the cloud platform, they may be routed through the analytics service module or otherwise stored in a database (e.g., database 104) of the cloud platform for later reference, according to some embodiments. According to some embodiments, the client project IDs and partner project IDs as processed by the analytics service module or otherwise organized and stored in the database may be referred to as "client records" herein.

According to some embodiments, each marketing campaign or other project generated by the analytics service module may be associated with an internal project ID, according to some embodiments. According to some embodiments, an internal project ID may be generated from a client project ID received from the client or a partner project ID received from the client or from the partner platform. Alternatively, internal project IDs may be generated (306) independently of the project IDs from the client records and may be later mapped thereto upon receiving each.

Integration procedure 302 may further include receiving (308) from the partner platform the partner platform's records of partner project IDs associated with the client, according to some embodiments.

Integration procedure 302 may further include identifying (310) the partner project IDs as received from the partner platform in the client records as received from the client, according to some embodiments. The client records may be fetched from the cloud platform's database by way of the analytics service module, according to some embodiments. If a partner project ID as received from the partner platform is not found to match a partner project ID of the client records, an error may be relayed (312) to the client, according to some embodiments. According to some embodiments, the error may be relayed to the partner platform, engineers of the cloud platform, or any other entity involved with the integration procedure 302. If the partner project IDs are identified in the client records, a mapping may be generated (314) between the client project IDs of the client records, the partner project IDs as received from the partner platform, and the internal project IDs of the cloud platform, according to some embodiments.

As described above, method 300 further includes identification procedure 314. According to some embodiments, a partner platform may transmit data to the cloud platform in order to update, in the database of the cloud platform, records associated with a marketing campaign or other project implemented on the partner platform. Data transmitted by the partner platform may include partner event data (e.g., partner event data 114), among other data associated with updates related to the marketing campaign or relevant to the analytics thereof. According to some embodiments, partner event data may include events that have taken place inside the partner platform including, but not limited to, updates to consumer data, new consumer interactions, relevant consumer communication, consumer-to-purchaser conversions, as well as other consumer activity inside the partner platform, among others. According to some embodiments, the data transmitted by the partner may be received (316) at the cloud platform as inbound data, which includes referential partner project IDs. The inbound data may be transmitted by way of cloud platform APIs. According to some embodiments, the inbound data may be transmitted by way of other communication protocols, including APIs provided by the partner platform, among others. Receiving inbound data from the partner platform may further include decrypting or otherwise interpreting encrypted data using decryption protocols as described above.

According to some embodiments, identification procedure 314 further includes identifying (318) the associated internal project IDs using the newly received referential partner project IDs, according to some embodiments. According to some embodiments, identifying the associated internal project IDs may include using other data provided in the inbound data received from the partner platform, such as consumer IDs, among others. In some embodiments, inbound data may identify consumer IDs for updates to the consumer data associated thereto. Once the consumer IDs or associated internal project IDs are identified, the inbound data may be routed (320) to the database's data storage associated with the consumer IDs or internal project IDs and stored thereon, according to some embodiments. According to some embodiments, the inbound data may be alternatively routed to an analytics procedure executing on the analytics service module, according to some embodiments. The analytics service module, after processing the inbound data, may further route the inbound data to the database of the cloud platform for storing at the data storage associated with the consumer IDs or internal project IDs.

Figure 4:
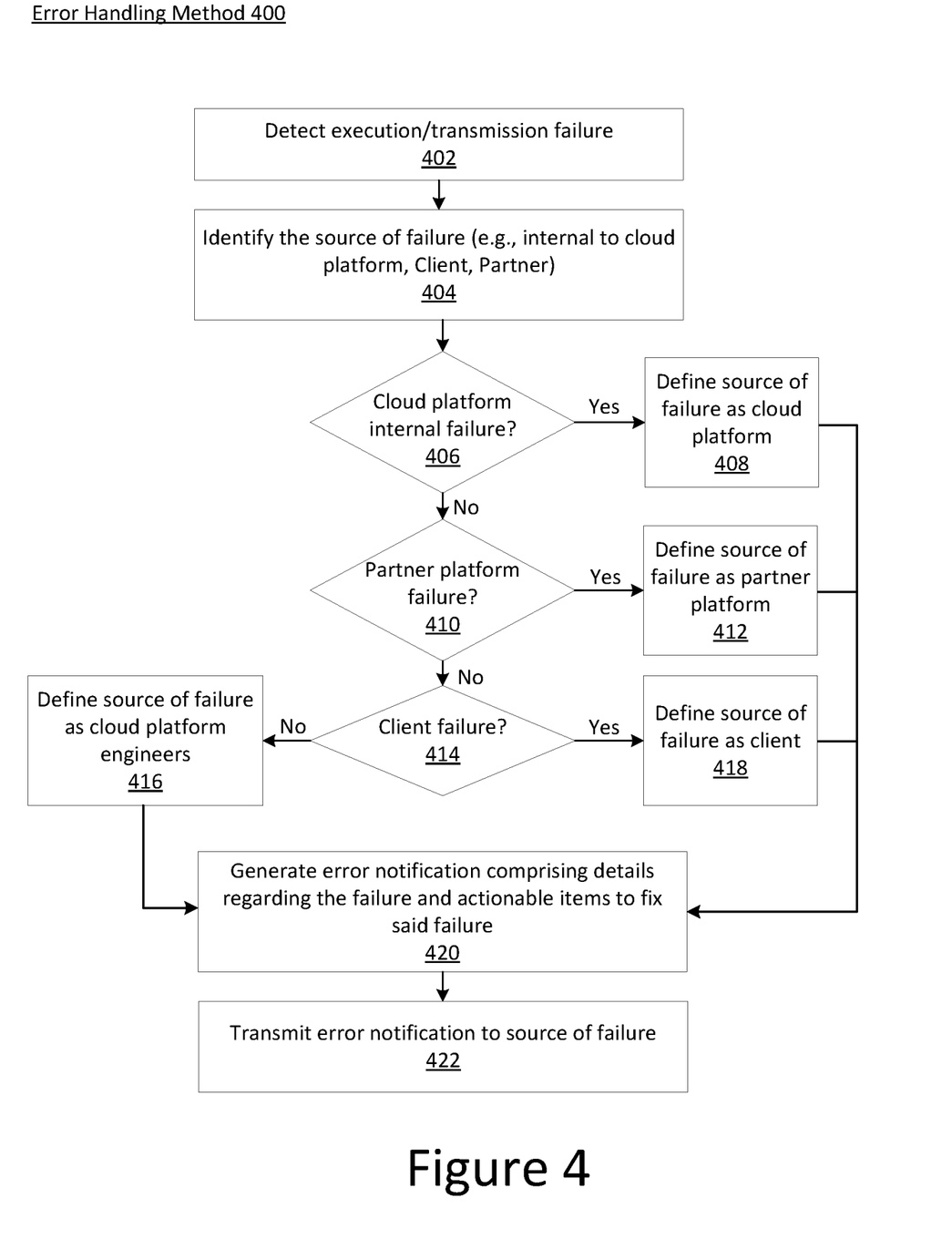
FIG. 4 illustrates an exemplary method for automated error handling, according to some embodiments.

FIG. 4 illustrates an exemplary method for automated error handling, according to some embodiments. Error handling method 400 may include detecting (402) at a cloud platform (e.g., cloud platform 102) a failure in execution of a process or data transmission. According to some embodiments, error handling method 400 may be executed by the cloud platform or sub-elements thereof, including a database (e.g., database 104), an analytics service module (e.g., analytics service module 106), a partner engine (e.g., partner engine 108), an event engine (e.g., event engine 116), a client-facing portal module (e.g., client-facing portal module 118), other sub-elements of the cloud platform, or a combination thereof.

According to some embodiments, error handling method 400 further includes identifying (404) a source of the detected failure. Sources of failure may include, but are not limited to, the cloud platform, a client (e.g., client device interface 120), or a partner platform (e.g., partner platform 112). Specifically, sources of failure may further include, according to some embodiments, internal failures of the cloud platform, failures associated with sub-elements of the cloud platform, failures related to other devices associated with the cloud platform, failures associated with a client, failures associated with a partner platform, or a combination thereof, among others.

According to some embodiments, error handling method 400 may further include determining whether (406) the source of failure is the cloud platform or an associated internal failure thereof. If the cloud platform is determined to be the source of failure, the source of failure may be defined (408) as the cloud platform. If the cloud platform is not determined to be the source of failure, error handling method 400 may further include determining whether (410) the source of failure is the partner platform or communication associated therewith. If the partner platform is determined to be the source of failure, the source of failure may be defined (412) as the partner platform. If the partner platform is not determined to be the source of failure, error handling method 400 may further include determining whether (414) the source of failure is the client or communication associated therewith. If the client is not determined to be the source of failure, the source of failure may be defined (416) as the engineers of the cloud platform. Alternatively, if the client is determined to be the source of failure, the source of failure may be defined (418) as the client.

Error handling method 400 may further include generating (420) an error notification comprising details regarding the failure and actionable items to fix said failure. According to some embodiments, the error notification may not necessarily include actionable items to fix said failure. Actionable items to fix said failure may include, but are not limited to, successful solutions that fixed similar failures in the past, troubleshooting guidance to address similar failures, or other suggestions related to fixing failures associated with the source of failure, according to some embodiments.

Error handling method 400 may further include transmitting (422) the error notification to the source of failure.

According to some embodiments, the error notification may be transmitted by various communication protocols depending on the source of failure. Communication protocols may include, but are not limited to, email, graphical user interface (GUI) notifications, RSS feed transmissions, or any other digital message protocol, according to some embodiments.

Figure 5:
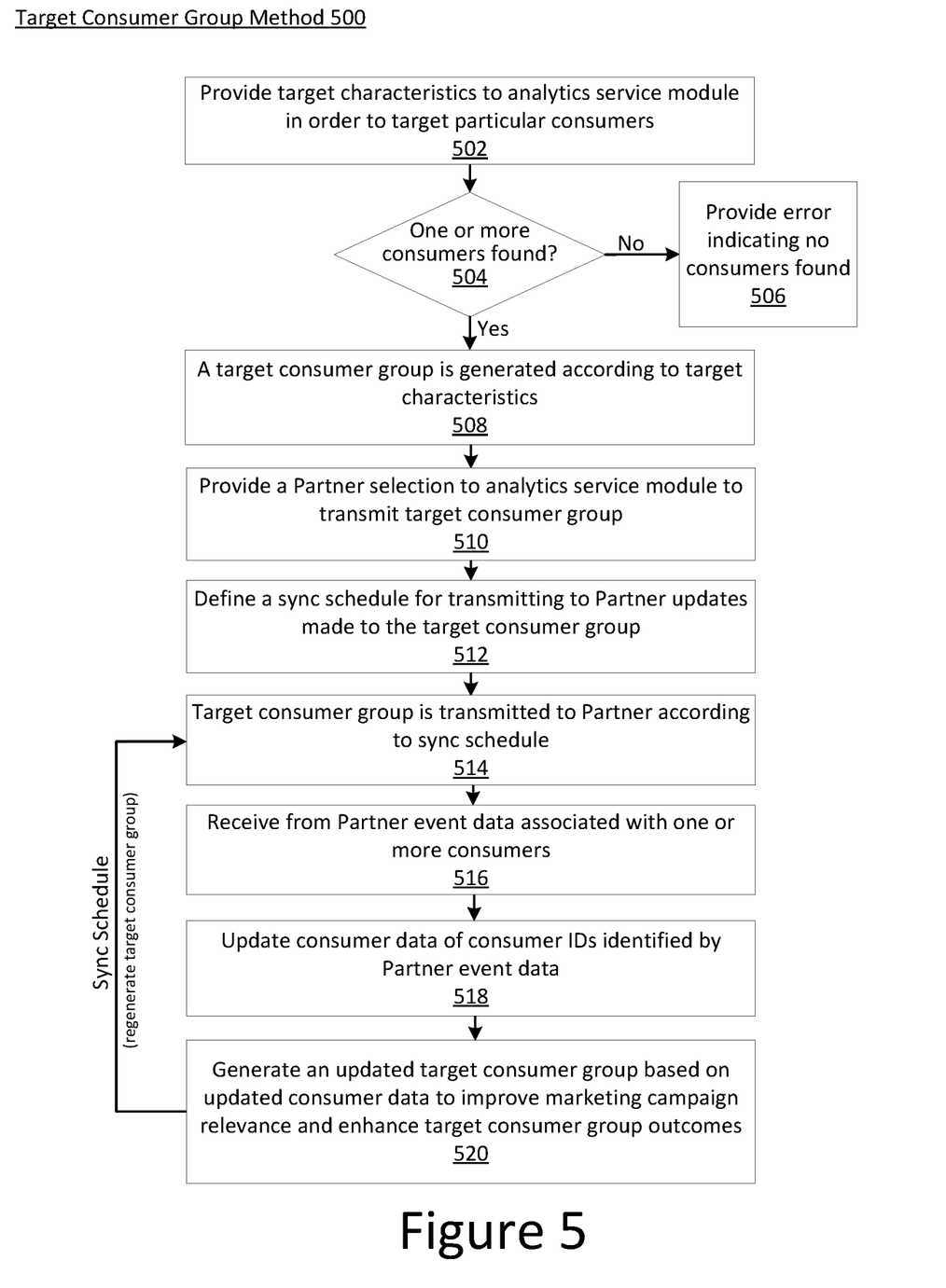
FIG. 5 illustrates a client interface perspective of an exemplary method for generating a target consumer group, according to some embodiments.

FIG. 5 illustrates a client interface perspective of an exemplary method for generating a target consumer group, according to some embodiments. Method 500 may be executed at an analytics service module (e.g., analytics service module 106) by way of a client-facing portal module (e.g., client-facing portal module 118), according to some embodiments. Method 500 includes providing (502) by a client device interface (e.g., client device interface 120) target characteristics to the analytics service module. According to some embodiments, a client device interface may provide a client with the ability to define target characteristics that describe the consumers intended as the target of a particular marketing campaign, herein "target consumers." Target characteristics may be dynamically adjusted according to updated information, including data provided by the partner platform or other data associated with the target consumer. By updating the target characteristics, the analytics service module may update the associated target consumer group, according to some embodiments.

According to some embodiments, target characteristics of the target consumer may include, but are not limited to, stage of exposure, content preferences, purchase history, browsing activity, among others. Target characteristics associated with the stage of exposure of the target consumer may include whether or not the consumer has been invited to interact with the client, successful interaction with previous marketing campaigns, among others. Target characteristics associated with the content preferences of the target consumer may include products or services liked by the consumer, products or services disliked by the consumer, content categories most commonly frequented by the consumer, among others. Target characteristics associated with the purchase history of the target consumer may include products or services purchased by the consumer through a partner platform, products or services used by the consumer to interact with a partner platform (e.g., mobile device, computer), among others. Target characteristics associated with the browsing activity of the target consumer may include search history, other internet activity, behavior on a particular partner platform, among others. Other target characteristics may be defined or otherwise provided to the analytics service module, according to some embodiments.

According to some embodiments, once the targeted characteristics are provided to the analytics service module, the client device interface may indicate whether one or more consumers that matches the target characteristics (e.g., target consumer) has been found (504). If one or more target consumers are not found, an error may be provided (506) indicating that no consumer matching the target characteristics has been found, according to some embodiments. However, if one or more target consumers are found, a target consumer group may be generated (508) by analytics service module according to the target characteristics specified by the client. The target consumer group may include information indicative of the one or more consumers contained therein, including, but not limited to, consumer group definitions (e.g., consumer group definitions 110), or other data related to the consumer group, according to some embodiments.

For example, a target characteristic may be provided to an analytics service module indicating that the target consumers have a browsing activity associated with dog treats. According to some embodiments, this target characteristic may be specified further by indicating that the target consumers have a browsing activity associated with a particular location, such as the United States. As a result, the analytics service module may attempt to find consumers located in the United States that have browsed online for dog treats.

According to some embodiments, method 500 may further include providing (510) a selection of a partner platform specified by the client. The client device interface may provide to the client by way of the client device interface, partner platforms available for receiving a target consumer group for a specified marketing campaign, according to some embodiments.

According to some embodiments, method 500 may further include defining (512) a sync schedule for transmitting to the selected partner platform updates made to the target consumer group. A sync schedule may be custom built by the client or otherwise selected by the client from suggested sync schedules provided by the analytics service module by way of the client device interface, according to some embodiments. For example, a client may define a sync schedule as transmitting to the selected partner platform updates made to the target consumer group every 5 minutes. As another example, the client device interface may provide to the user suggested sync schedules, such as once per day, once per week, or once per month. The client device interface may receive a selection from the client indicating a sync schedule of once per day and transmit the selection to the analytics service module by way of the client-facing portal module. According to some embodiments, the sync schedule may be automatically set or overwritten by the analytics service module to reduce, maintain, or balance the processing required by the cloud platform. For example, if the cloud platform is nearing its processing capacity, the analytics service module 106 may alter sync schedules to reduce processing demand. Similarly, a sync schedule may incorporate checkpoints for data transmission. According to some embodiments, if a sync schedule ends a transmission before all of the data has been transferred, a checkpoint may be generated to identify where to begin the data transmission once the sync schedule initiates the transmission once again.

According to some embodiments, method 500 may further include transmitting (514), by way of the partner engine, the target consumer group to the selected partner platform according to the sync schedule. Transmitting the target consumer group to the partner platform may further include transmitting other data associated with the target consumer group, including consumer IDs, associated consumer properties, among others. According to some embodiments, transmitting the target consumer group may further include encrypting the target consumer group and associated data using encryption protocols as described above. In some embodiments, if a target consumer group has been updated by the platform server, the platform server may transmit the changes to the partner platform rather than the entire target consumer group. By transmitting only the updates and other changes made to the target consumer group, the platform server minimizes the size of transmission, reduces network congestion, and improves network efficiency.

According to some embodiments, method 500 may further include receiving (516), from the partner platform by way of the event engine, partner event data (e.g., partner event data 114). Partner event data may include data associated with events that have taken place inside the partner platform including, but not limited to, updates to consumer data, new consumer interactions, relevant consumer communication, consumer-to-purchaser conversions, as well as other consumer activity inside the partner platform, partner project ID(s) associated with a particular marketing campaign, marketing analytics, data related to consumers of the partner platform, among others. Partner event data may be indicative of updates to consumer data associated with one or more consumer IDs of consumers.

According to some embodiments, method 500 may further include updating (518) the consumer data associated with consumers identified by the partner event data target consumer group based on the target characteristics as previously defined by the client. Updating the consumer data may include adding, removing, or otherwise editing data associated with one or more target characteristics. In some embodiments, method 500 may further generate an updated target consumer group (520) based on the updated consumer data according to the target characteristics, according to some embodiments. An updated target consumer group may provide better target consumers for a specified marketing campaign, improve campaign relevance to said target consumers, and enhance outcomes of marketing campaigns, according to some embodiments. For example, if target characteristics identify consumers who have searched for the client, updates to consumer data that indicate searches for the client would decrease the number of uninterested consumers in the updated target consumer group. As such, costs for that particular marketing campaign may be significantly reduced. According to some embodiments, updates to the target characteristics may accomplish a similar improvement to the target consumer group.

According to some embodiments, a client may manually update the target characteristics of a target consumer group by way of the client device interface. The client may reference partner event data received from the partner platform to manually identify target characteristics that could improve target consumer group outcomes, according to some embodiments. Alternatively, partner event data received from the partner platform may be processed by the analytics service module of the cloud platform to automatically identify patterns in the partner event data or detect similarities to other partner event data from other clients in order to provide suggestions to the client that would improve consumer group outcomes.

According to some embodiments, the analytics service module of the cloud platform may further include a machine learning module (e.g., ML module 107) that processes updates made to consumer data or target characteristics to identify updates that most improve consumer group outcomes. The analytics service module may display or otherwise provide the updates to the client as recommendations to enhance the target consumer group. For example, these recommendations may include target consumer group enhancements indicative of updates to the target characteristics or consumer data for improving a target consumer group and, as a result, the consumer group outcomes. Furthermore, the analytics service module may automatically apply updates to target characteristics based on output produced by the machine learning module, according to some embodiments. According to some embodiments, the machine learning module may implement one or more machine learning algorithms for processing data associated with more than one client. The one or more machine learning algorithms implemented by the machine learning module may train and develop mathematical models trained to identify updates that most improve consumer group outcomes, according to some embodiments. According to some embodiments, a universal model may be trained and further developed to be used for multiple clients. Alternatively, models may be individually trained and developed for use by a particular client across marketing campaigns, according to some embodiments. Further still, models may be individually trained and developed for particular marketing campaigns of an individual client, according to some embodiments.

According to some embodiments, one or more machine learning algorithms of the machine learning module may implement various training strategies including, but not limited to, active learning, classification, regression, similarity learning, unsupervised learning, reinforcement learning, deep learning, federated learning, among others. According to some embodiments, the models developed by the one or more machine learning algorithms may include, but are not limited to, linear regression, polynomial regression, logistic regression, artificial neural networks (ANN), Bayesian networks, among others.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory or transitory computer-readable medium.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on. The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth the preferred embodiment and certain modifications of the concept underlying the present disclosure, various other embodiments as well as certain variations and modifications of the embodiments herein shown and described will obviously occur to those skilled in the art upon becoming familiar with said underlying concept.

We claim:

1. A computer-implemented method, comprising:
    providing a cloud platform configured to communicate with a plurality of client devices and a plurality of partner platforms,
        wherein the client devices are associated with entities wishing to use the partner platforms to present content to consumers, and
        wherein the partner platforms are configured to present the content on devices associated with the consumers;
    receiving, by the cloud platform and from a client device of the plurality of client devices, a first set of data having internal consumer data that has (i) a consumer ID associated with a consumer and (ii) target characteristics;
    generating, by the cloud platform, from the internal consumer data, a target consumer group based on the target characteristics, the target consumer group being updatable based on consumer update data,
        wherein the consumer update data is provided by integrating the internal consumer data with partner data received from a partner platform of the plurality of partner platforms;
    transmitting, by the cloud platform to the partner platform, authentication credentials associated with the client device and the partner platform,
        wherein the partner platform uses the authentication credentials to authenticate the client device in the partner platform;
    responsive to the authentication, transmitting, by the cloud platform to the partner platform, the target consumer group or an updated target consumer group; and
    receiving, by the cloud platform and from the partner platform, partner data indicative of a partner event on the partner platform,
        wherein the partner data is used by the cloud platform to provide the consumer update data,
        wherein the plurality of partner platforms provide the cloud platform with partner data in a variety of data structures, and
        wherein the cloud platform provides a partner transformation language for mapping the partner data received from each partner platform to a uniform representation of similarly structured data that is interpretable by the cloud platform.

2. The computer-implemented method of claim 1, further comprising:
    determining, by the cloud platform and according to the partner transformation language, event instructions associated with the partner event, wherein the event instructions are executable by the cloud platform;
    identifying, by the cloud platform, a data store location associated with the consumer indicated by consumer update data;
    storing, by the cloud platform, the consumer update data in the data store location associated with the consumer indicated by the consumer update data; and
    determining, by the cloud platform, updated consumer data by updating consumer data associated with the consumer ID associated with the consumer update data indicated in the event instructions.

3. The computer-implemented method of claim 2, further comprising:
    identifying, by the cloud platform, a target consumer group associated with the consumer ID of the consumer;
    determining, by the cloud platform, updates to the target consumer group associated with the consumer ID according to at least one of the updated consumer data, the target characteristics, and the partner data, wherein the updates are used to generate a new target consumer group; and
    transmitting, by the cloud platform to the partner platform, the updates to the target consumer group.

4. The computer-implemented method of claim 1, further comprising determining target characteristics based on target instructions provided by a user.

5. The computer-implemented method of claim 1, wherein the cloud platform utilizes a sync schedule that indicates when data may be transmitted to the partner platform.

6. A system, comprising:
    a cloud platform configured to communicate with a plurality of client devices and a plurality of partner platforms, wherein the client devices are associated with entities wishing to use the partner platforms to present content to consumers, and wherein the partner platforms are configured to present the content on devices associated with the consumers, the cloud platform comprising:
        a database;
        a client-facing portal adapted to receive, from a client device from the plurality of client devices, a first set of data having internal consumer data that has (i) a consumer ID associated with a consumer and (ii) target characteristics;
        a partner engine configured to facilitate outbound communication to a partner platform from the plurality of partner platforms,
            wherein the outbound communication comprises authentication credentials associated with the client device and the partner platform, and
            wherein the partner platform uses the authentication credentials to authenticate the client device in the partner platform;
        an event engine configured to facilitate inbound communication of the cloud platform, and to receive partner data from the partner platform, the partner data indicative of a partner event on the partner platform, wherein the partner data comprises consumer update data; and
        an analytics service module communicatively coupled to the partner engine, the event engine, the client-facing portal, and the database, wherein the analytics service module generates a target consumer group from the internal consumer data based on the target characteristics, the target consumer group being updatable based on the consumer update data, wherein the consumer update data is provided by integrating the internal consumer data with the partner data,
wherein the plurality of partner platforms provide the cloud platform with partner data in a variety of data structures, and
wherein the event engine provides a partner transformation language for mapping the partner data received from each partner platform to a uniform representation of similarly structured data that is interpretable by the cloud platform.

7. The system of claim 6, wherein the partner engine encrypts outbound data using encryption protocols.

8. The system of claim 6, wherein the event engine is further configured to:
receive inbound data from one or more of the partner platform, webhooks, and other encrypted or unencrypted sources;
interpret inbound data based on the source from which the inbound data is received;
generate instructions compatible with the analytics service module; and
transmit instructions to the analytics service module.

9. The system of claim 8, wherein interpreting inbound data comprises mapping inbound data to instructions compatible with the analytics service module by referencing the partner transformation language.

10. The system of claim 6, further comprising a sync schedule that indicates when data may be transmitted to or requested from the partner platform.

11. The system of claim 10, wherein the sync schedule comprises a checkpoint module for marking a point in a large dataset for resuming a transfer of the large dataset therefrom.

12. The system of claim 6, wherein the client-facing portal provides a user with a graphical user interface (GUI) for receiving human-readable instructions from the user, wherein the human-readable instructions are associated with operations readable by the cloud platform configured to facilitate the functions of the system.

13. A non-transitory computer-readable medium storing instructions that, when executed by one or more processors, are operable to cause the one or more processors to perform operations comprising:
providing a cloud platform configured to communicate with a plurality of client devices and a plurality of partner platforms,
wherein the client devices are associated with entities wishing to use the partner platforms to present content to consumers, and
wherein the partner platforms are configured to present the content on devices associated with the consumers;
receiving, by the cloud platform and from a client device of the plurality of client devices, a first set of data having internal consumer data that has (i) a consumer ID associated with a consumer and (ii) target characteristics;
generating, by the cloud platform, from the internal consumer data, a target consumer group based on the target characteristics, the target consumer group being updatable based on consumer update data,
wherein the consumer update data is provided by integrating the internal consumer data with partner data received from a partner platform of the plurality of partner platforms;
transmitting, by the cloud platform to all the partner platform, authentication credentials associated with the client and the partner platform,
wherein the partner platform uses the authentication credentials to authenticate the client device in the partner platform;
responsive to the authentication, transmitting, by the cloud platform to the partner platform, the target consumer group or an updated target consumer group; and
receiving, by the cloud platform and from the partner platform, partner data indicative of a partner event on the partner platform,
wherein the partner data is used by the cloud platform to provide the consumer update data,
wherein the plurality of partner platforms provide the cloud platform with partner data in a variety of data structures, and
wherein the cloud platform provides a partner transformation language for mapping the partner data received from each partner platform to a uniform representation of similarly structured data that is interpretable by the cloud platform.

14. The non-transitory computer-readable medium of claim 13, wherein the operations further comprise:
determining, according to the partner transformation language, event instructions associated with the partner event, wherein the event instructions are executable by the cloud platform;
identifying a data store location associated with the consumer indicated by the consumer update data;
storing the consumer update data in the data store location associated with the consumer indicated in the consumer update data; and
determining updated consumer data by updating consumer data associated with the consumer ID associated with the consumer update data indicated in the event instructions.

15. The non-transitory computer-readable medium of claim 14, wherein the operations further comprise:
identifying a target consumer group associated with the consumer ID of the consumer;
determining updates to the target consumer group associated with the consumer ID according to at least one of the updated consumer data, the target characteristics, and the partner data, wherein the updates are used to generate a new target consumer group; and
transmitting, to the partner platform, the updates to the target consumer group.

16. The non-transitory computer-readable medium of claim 13, wherein the operations further comprise determining target characteristics based on target instructions provided by a user.

17. The non-transitory computer-readable medium of claim 13, wherein the cloud platform utilizes a sync schedule that indicates when data may be transmitted to the partner platform.

* * * * *